(12) United States Patent
Diana (10) Patent No.: US 12,191,791 B2
(45) Date of Patent: Jan. 7, 2025

(54) METHOD FOR CONTROLLING A DRIVETRAIN OF AN ELECTRIC VEHICLE, DATA PROCESSING DEVICE, DRIVETRAIN AND ELECTRIC VEHICLE

(71) Applicant: Volvo Car Corporation, Gothenburg (SE)

(72) Inventor: Michela Diana, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 176 days.

(21) Appl. No.: 17/982,564

(22) Filed: Nov. 8, 2022

(65) Prior Publication Data

US 2023/0155535 A1    May 18, 2023

(30) Foreign Application Priority Data

Nov. 15, 2021  (EP) .................................... 21208303

(51) Int. Cl.
*H02P 27/08* (2006.01)
*B60L 15/20* (2006.01)
*H02P 23/14* (2006.01)

(52) U.S. Cl.
CPC .............. *H02P 27/08* (2013.01); *B60L 15/20* (2013.01); *H02P 23/14* (2013.01)

(58) Field of Classification Search
CPC ........... H02P 27/08; H02P 23/14; B60L 15/20
See application file for complete search history.

(56) References Cited

U.S. PATENT DOCUMENTS

| | | |
|---|---|---|
| 4,348,619 A | 9/1982 | Ray et al. |
| 2009/0058337 A1* | 3/2009 | Kato ..................... H02P 29/662 |
| | | 318/400.09 |
| 2009/0146612 A1 | 6/2009 | Oyobe et al. |
| 2013/0009585 A1* | 1/2013 | Hashimoto ............. H02P 27/08 |
| | | 318/503 |

(Continued)

FOREIGN PATENT DOCUMENTS

| | | |
|---|---|---|
| DE | 102017216386 A1 | 3/2019 |
| EP | 3081429 A1 | 10/2016 |

OTHER PUBLICATIONS

May 3, 2022 European Search Report issued in corresponding International Application No. 21208303.

*Primary Examiner* — Zoheb S Imtiaz
(74) *Attorney, Agent, or Firm* — Clements Bernard Walker; Christopher L. Bernard (57) ABSTRACT

A method for controlling a drivetrain of an electric vehicle during DC-charging of a traction battery. A corresponding charging circuit includes at least partially a traction inverter unit and at least partially an electric machine. The method includes controlling the traction inverter unit such that it operates as a DC-DC converter. Furthermore, a position of a rotor of the electric machine is received and based thereon, a number out of the phases of the electric machine is selected as components of the charging circuit. Additionally, the traction inverter unit is controlled such that the selected number of the phases forms part of the charging circuit. Moreover, a data processing device having means for carrying out the steps of the above method is presented. Additionally, a drivetrain and an electric vehicle are explained.

14 Claims, 5 Drawing Sheets

(56) References Cited

U.S. PATENT DOCUMENTS

| | | | |
|---|---|---|---|
| 2014/0232304 A1* | 8/2014 | Sekiya | B60L 3/0061 |
| | | | 318/400.02 |
| 2015/0214867 A1* | 7/2015 | Takahashi | H02P 21/50 |
| | | | 318/400.02 |
| 2022/0302867 A1* | 9/2022 | Prasad | B60L 53/22 |
| 2022/0368270 A1* | 11/2022 | Huang | B60L 58/27 |
| 2023/0223824 A1* | 7/2023 | Hara | H02P 21/22 |
| | | | 310/68 R |

\* cited by examiner

Lac — — Lca

Fig. 5

······· Lab —·— Lba

METHOD FOR CONTROLLING A DRIVETRAIN OF AN ELECTRIC VEHICLE, DATA PROCESSING DEVICE, DRIVETRAIN AND ELECTRIC VEHICLE

CROSS-REFERENCE TO RELATED APPLICATION

The present disclosure claims the benefit of priority of co-pending European Patent Application No. 21 208 303.4, filed on Nov. 15, 2021, and entitled "METHOD FOR CONTROLLING A DRIVETRAIN OF AN ELECTRIC VEHICLE, DATA PROCESSING DEVICE, DRIVETRAIN AND ELECTRIC VEHICLE," the contents of which are incorporated in full by reference herein.

TECHNICAL FIELD

The present disclosure relates to a method for controlling a drivetrain of an electric vehicle during direct current (DC)-charging of a traction battery of the drivetrain. The drivetrain includes the traction battery, a N-phase traction inverter unit and a N-phase electric machine. The electric machine is electrically coupled to the traction battery via the inverter unit.

Moreover, the present disclosure is directed to a data processing device having means for carrying out the steps of the above method.

Additionally, the present disclosure concerns a drivetrain for an electric vehicle, the drivetrain including such a data processing device, and an electric vehicle having such drivetrain.

BACKGROUND

When charging the traction battery of a drivetrain, the N-phase traction inverter together with the N-phase electric machine may be used as a DC-DC converter. Essentially, the power switches of the N-phase traction inverter are used together with the magnetic coils of the N-phase electric machine to perform the DC-DC conversion. If the DC-voltage of the traction battery is higher than the DC voltage of a corresponding charging station, the traction inverter and the electric machine connected thereto may operate as a so-called DC-DC-boost converter.

In such a drive train a supplementary, so-called on-board charger may be omitted which leads to reduced weight and costs of the drivetrain.

It is known in this context that the DC-DC conversion produces a so-called current ripple, i.e. a generally undesired alternating current (AC) component having high frequency and high amplitude which is superimposed over the output DC current. The amplitude of the current ripple generally depends on the phase inductances of the electric machine, the switching frequency and the voltage difference between the charging station and the battery voltage. Current ripple produces losses in the electric machine which leads to the generation of heat.

In order to mitigate the problems resulting from the current ripple, usually capacitors are used as filter elements.

The problem to be solved by the present disclosure consists in further reducing the problems and negative effects being caused by the current ripple.

SUMMARY

The problem is at least partially solved or alleviated by the subject matter of the present disclosure.

According to a first aspect, there is provided a method for controlling a drivetrain of an electric vehicle during DC-charging of a traction battery of the drivetrain, the drivetrain including the traction battery, a N-phase traction inverter unit, a N-phase electric machine and a charging circuit, the electric machine being electrically coupled to the traction battery via the inverter unit, the charging circuit including at least partially the traction inverter unit and at least partially the electric machine, the method including: controlling the traction inverter unit such that the traction inverter unit operates as a DC-DC converter, receiving a position of a rotor of the electric machine, selecting a number out of the N phases of the electric machine as components of the charging circuit, the selection being dependent on the position of the rotor of the electric machine, and controlling the traction inverter unit such that the selected number out of the N phases of the electric machine forms part of the charging circuit.

The general idea underlying the present disclosure is to make use of an anisotropy of the electric machine with respect to the inductances being provided when seen from the traction inverter unit's perspective. The higher the inductances are, the better current ripple may be suppressed and the lower are the high frequency losses in the electric machine. These inductances are known if the position of the rotor of the electric machine is known. Based thereon, a number out of the N phases of the electric machine may be selected as components of the charging circuit. This number is chosen such that the best available suppression of current ripple is achieved. The number of the N phases being selected as components of the charging circuit is thus a particular number.

The fact that the charging circuit includes at least partially the traction inverter unit and at least partially the electric machine means that the traction battery is charged via the traction inverter unit and the electric machine. Thus, the traction inverter unit and the electric machine are used both for charging and for providing traction power. This dual use has the effect that the corresponding drive train is compact. Furthermore, the costs for the drivetrain are reduced.

For the present disclosure, receiving a position of a rotor of the electric machine means receiving an information, a parameter or a value characterizing the mechanical position of the rotor of the electric machine, e.g. a value referring to a number of degrees designating a rotational position. Thus, the position of the rotor of the electric machine can be designated a mechanical position.

In the present context a number of the N phases of the electric machine may includes any subset of the N phases and all N phases.

It is noted that the electric legs of the traction inverter being connected to non-selected phases of the electric machine are not used for charging. Consequently, the charging is performed by the number of the N phases only. It is thus possible to use a number of the N phases that is less than the total number of phases for charging. The non-selected phases of the electric machine and the corresponding electric legs of the inverter unit are electrically disconnected by opening the corresponding power switches of the inverter unit. The selection of the phases, thus, is performed by sending a switching signal to the relevant power switches which may be formed as transistors.

Generally speaking, the traction inverter unit may use semiconductor parts and therefore may be designated a semiconductor traction inverter.

Using the method according to the present disclosure leads to reduced current ripple which results in reduced high frequency losses. In other words, the efficiency of DC-DC charging is enhanced. This also results in an extended lifetime of the components of the drivetrain. Moreover, a size of a filter capacitor can be reduced since usually the lowest possible inductance value is considered for dimensioning the filter capacitor. As a consequence thereof, size and cost of the drivetrain may be reduced.

The traction inverter unit may be controlled to operate as an interleaved DC-DC converter, interleaving the selected ones of the N phases. As has been described before, the selected ones of the N phases may be all of the N phases or a subset of the N phases. Interleaving means that the selected ones of the N phases are used according to a predefined timing schedule. This reduces the output current ripple.

According to an example, out of the available combinations of numbers of the N phases, the alternative offering the highest equivalent inductance is selected. It has already been mentioned that a high inductance leads to an efficient and effective suppression of current ripple. Thus, the equivalent inductance is a well-suitable parameter for deciding on the best choice of the number of the N phases. The equivalent inductance is always assessed from the perspective of the traction inverter unit. The equivalent inductance includes both self inductance and mutual inductance. Consequently, the present example offers a simple and reliable way of reducing current ripple.

It is possible that the equivalent inductance of all available combinations of numbers of the N phases in function of the position of the rotor of the electric machine is received from a look-up table. Such a look-up table may also be designated a map of inductances. The look-up table may for example be generated during a test of the electric machine at the end of its production. Alternatively, the look-up table can be generated using a computer simulation. The look-up table is a simple and reliable manner of providing the relevant information about the equivalent inductances. Furthermore, the use of a look-up table is computationally efficient.

In the look-up table, the equivalent inductances may be represented in function of at least one of a current and a duty cycle. The duty cycle depends from the difference between the voltage offered by the charging station and the operational voltage of the traction battery. From the duty cycle, a current for charging can be derived. The look-up table can, thus, for example be entered with a motor position and a current. Consequently, the equivalent inductances are available for at least a great variety of operational conditions, if not for all operational conditions.

In an example, out of the available combinations of numbers of the N phases, the alternative offering the lowest electromagnetic losses may be selected. In this context, the electromagnetic losses include iron losses, copper losses, and permanent magnet losses. As explained before, the higher the ripple amplitude is, the higher are the losses. The losses may lead to undesired heat production and low efficiency of charging. Thus, the losses are also a well-suitable parameter for deciding on the number of the N phases to be selected. Thus, the present example offers a simple and reliable way of reducing current ripple.

To this end, the electromagnetic losses of all available combinations of numbers of the N phases may be received from a look-up table in function of the position of the rotor of the electric machine. Such a look-up table may also be designated a map of losses. The look-up table may for example be generated during a test of the electric machine at the end of its production. Alternatively, the look-up table can be generated using a computer simulation. The look-up table is a simple and reliable manner of providing the relevant information about the losses. Furthermore, the use of a look-up table is computationally efficient.

It is understood that the above-mentioned equivalent inductances and the electromagnetic losses may be provided by a common or combined look-up table.

In the look-up table, the magnetic losses may be represented in function of at least one of a current and a duty cycle. As before, the duty cycle depends from the difference between the voltage provided by the charging station and the operational voltage of the traction battery. From the duty cycle, a current for charging can be derived. The look-up table can for example be entered with a motor position and a current. Consequently, the relevant losses are available for at least a great variety of operational conditions, if not for all operational conditions.

In a further example, the selection of all N phases as components of the charging circuit may be excluded if a duty cycle to be performed falls within a predefined duty cycle range, and all N phases may be pre-selected as components of the charging circuit if the duty cycle to be performed falls outside the predefined duty cycle range. This example is based on the finding that within a predefined duty cycle selecting all N phases seldom or never leads to the best available suppression of current ripple. Consequently, this alternative is excluded. This enhances the efficiency when performing the method according to the present disclosure. The predefined duty cycle range may be 40% to 60%. It is also possible that the predefined duty cycle range is 45% to 55% or 48% to 50%. Thus, using all the N phases as components of the charging circuit may be excluded if the duty cycle is roughly 50%.

Alternatively or additionally, the electromagnetic losses of all N phases may be compared to the electromagnetic losses being produced by the subset of the N phases having the highest electromagnetic losses and by selecting all N phases as components of the charging circuit only if the electromagnetic losses produced by all N phases are lower than the electromagnetic losses produced by the subset of the N phases having the highest electromagnetic losses. In doing so, it is guaranteed to select the number of the N phases leading to the most effective suppression of current ripple.

According to a second aspect, there is provided a data processing device having means for carrying out the steps of the method according to the present disclosure. The data processing device is for example a control unit or a controller for at least one of the drivetrain and the traction inverter. Such a data processing device leads to reduced current ripple which results in reduced high frequency losses. In other words, the efficiency of DC-DC charging is enhanced. This also results in an extended lifetime of the components of the drivetrain. Moreover, a size of a filter capacitor can be reduced since usually the lowest possible inductance value is considered for dimensioning the filter capacitor. As a consequence thereof, size and cost of the drivetrain may be reduced.

If look-up tables, e.g. as described above, are used, they can be stored in a memory of the data processing device. Alternatively, the look-up table may be provided externally to the data processing device. In the latter case, the data processing device includes an interface for receiving the relevant data from the look-up table.

In an example, the data processing device includes a first control interface being connectable to the traction inverter unit such that the traction inverter unit is controllable by the data processing device and a second control interface being connectable to a controller of the electric machine, the second control interface being configured for receiving a position of the rotor of the electric machine. Consequently, the data processing device may be easily integrated into a drivetrain.

According to a third aspect, there is provided a drivetrain for an electric vehicle, the drivetrain including a data processing device according to the present disclosure, a traction battery, a N-phase traction inverter unit and a N-phase electric machine, the electric machine being electrically coupled to the traction battery via the inverter unit and the data processing device being communicatively connected to at least the traction inverter unit such that the traction inverter unit is controllable by the data processing device. In such a drivetrain current ripple occurring during DC-DC charging is reduced and as a consequence thereof, high frequency losses are minimized. In other words, the efficiency of DC-DC charging is enhanced. This also results in an extended lifetime of the components of the drivetrain. Moreover, a size of a filter capacitor can be reduced since usually the lowest possible inductance value is considered for dimensioning the filter capacitor. As a consequence thereof, size and cost of the drivetrain may be reduced.

According to a fourth aspect, there is provided an electric vehicle having a drivetrain according to the present disclosure. The electric vehicle includes at least one wheel being coupled to the drivetrain. The traction battery of such a vehicle may be efficiently charged in a DC-DC charging scenario.

The above-described method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may include one or more of a processor, a memory, a data interface, or the like.

It should be noted that the above examples may be combined with each other irrespective of the aspect involved. Accordingly, the method may be combined with structural features of the data processing device, the drivetrain or the vehicle and, likewise, the data processing device, the drivetrain or the vehicle may be combined with features described above with regard to the method.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
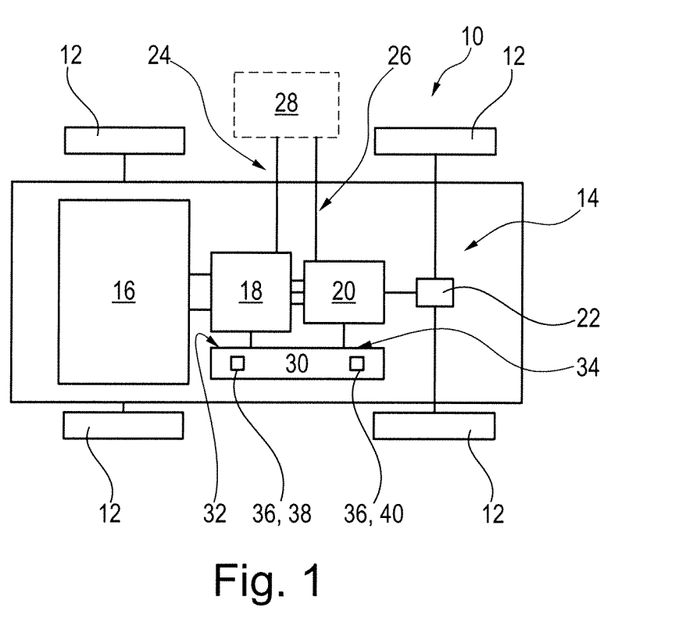
FIG. 1 shows a vehicle according to the present disclosure having a drivetrain according to the present disclosure, wherein the drivetrain includes a data processing device according to the present disclosure including means for carrying out the steps of the method according to the present disclosure.

FIG. 1 shows an electric vehicle 10 having a total of four wheels 12 and a drivetrain 14.

Two out of the four wheels 12 are driven wheels, i.e. these two wheels 12 are drivingly coupled to the drivetrain 14.

The drivetrain 14 includes a traction battery 16, a N-phase traction inverter unit 18 and a N-phase electric machine 20.

The electric machine 20 is electrically coupled to the traction battery 16 via the inverter unit 18. This means that the electric machine 20 is electrically coupled to the traction inverter unit 18 and the traction inverter unit 18 is electrically coupled to the traction battery 16.

The electric machine 20 is further coupled to the two driven wheels 12 via an axle gearing 22.

In the present example, the traction inverter unit 18 and the electric machine 20 have three phases respectively, i.e. N is three.

Moreover, the electric vehicle 10 includes a DC charging interface 24.

The charging interface 24 is electrically connected to the inverter unit 18 and the electric machine 20 such that the inverter unit 18 and the electric machine 20 may form part of a charging circuit 26.

In the example shown in FIG. 1, the vehicle 10 is electrically coupled with a DC charging station 28. Since the charging station 28 does not form part of the vehicle 10 it is represented in dashed lines. An alternative name for the charging station 28 is electric vehicle supply equipment (EVSE).

As an input filter for the current being provided by the charging station 28, the charging circuit 26 includes a capacitor $C_x$ which is arranged electrically parallel to the charging station 28.

The drive train 14 also includes a data processing device 30 being communicatively connected to the traction inverter unit 18 such that the traction inverter unit 18 is controllable by the data processing device 30.

In other words, the data processing device 30 is a control unit of the traction inverter unit 18.

In more detail, the data processing device 30 includes a first control interface 32 being connectable to the traction inverter unit 18 such that the traction inverter unit 18 is controllable by the data processing device 30.

Moreover, in the present example, the data processing device 30 includes a second control interface 34 being connectable to the electric machine 20, more specifically to a controller of the electric machine 20.

As will be explained in detail later, the second control interface 34 is configured for receiving a position of a rotor of the electric machine 20.

In the present example, the position of the rotor of the electric machine 20 is a mechanical position.

The data processing device 30 has also means 36 for carrying out the steps of a method for controlling the drivetrain 14 of the electric vehicle 10 during DC-charging of the traction battery 16 of the drivetrain 14.

The means include for example a processor 38 and a memory 40.

Figure 8:
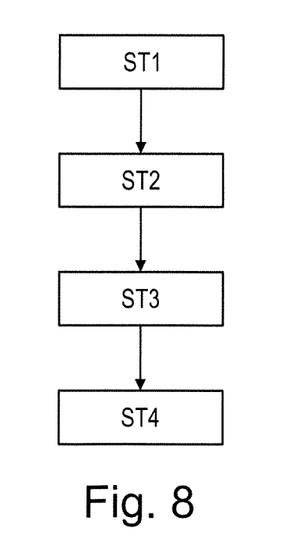
FIG. 8 shows steps of an example of a method according to the present disclosure.

The method is represented in FIG. 8 and in a first step ST1, the method controls the traction inverter unit 18 such that the traction inverter unit 18 operates as a DC-DC converter and such that the charging circuit 26 includes at least partially the traction inverter unit 18 and at least partially the electric machine 20.

Figure 2:
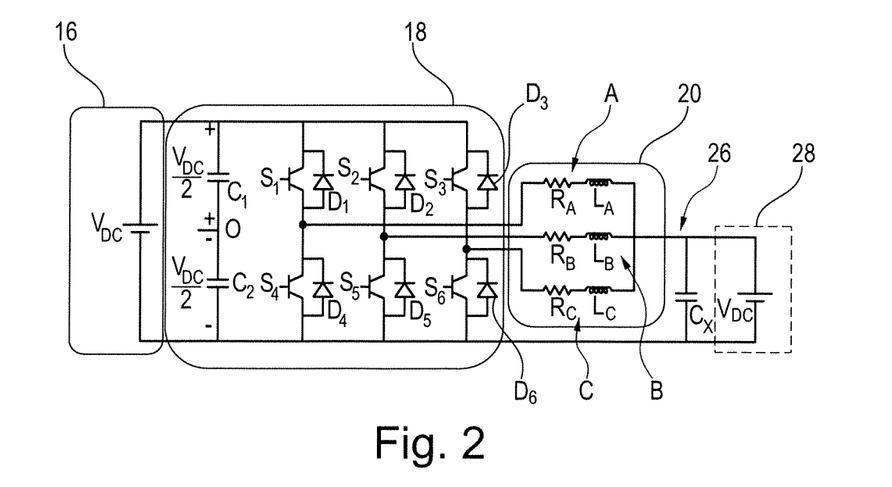
FIG. 2 shows details of selected components of the drivetrain of FIG. 1.

This means that a current originating from the DC charging station 28 is led through the resistances $R_A$, $R_B$, $R_C$ and the inductances $L_A$, $L_B$, $L_C$ of the three phases A, B, C of the electric machine 20 (cf. FIG. 2).

As can best be seen from FIG. 2, each of these phases A, B, c is connected to a corresponding leg of the inverter unit 18 at a respective connection point. Each of the legs includes two of the power switches S1, S2, S3, S4, S5, S6 and two corresponding diodes D1, D2, D3, D4, D5, D6.

In the present example, the voltage being provided by the charging station 28 is lower than the operational voltage of the traction battery 16. Consequently, the power switches S1, S2, S3, S4, S5, S6 of the inverter unit 18 are operated such that, in combination with the inductances $L_A$, $L_B$, $L_C$ of the electric machine 20 the DC voltage of the charging station 28 is boosted to the voltage of the traction battery 16.

It is noted that in the example of FIG. 2, the plus pole of the charging station 28 is connected to the neutral point of the electric machine 20 and the minus pole of the charging station is connected to the minus pole of the traction battery 16.

In a second step ST2, the method receives a position of a rotor of the electric machine 20. This is done via the second interface 34.

In a third step ST3 a number out of the three phases A, B, C of the electric machine 20 is selected as components of the charging circuit 26. This selection is dependent on the position of the rotor of the electric machine 20.

This means that not necessarily all three phases A, b, C of the electric machine 20 form part of the charging circuit 26.

In a first example, the numbers out of the three phases A, B, C is selected such that the alternative offering the highest equivalent inductance is chosen.

This will be explained in detail with additional reference to FIGS. 3 to 7.

Figure 3:
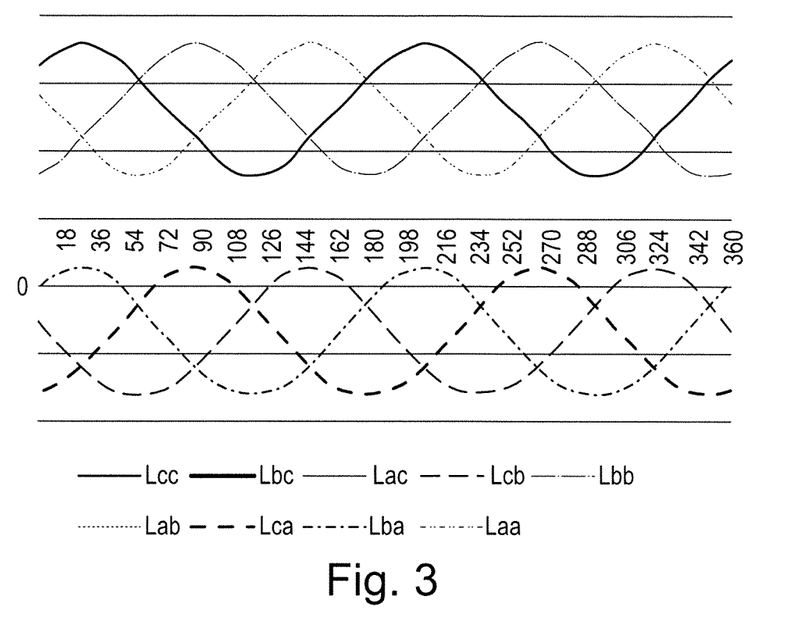
FIG. 3 shows exemplary self inductances and exemplary mutual inductances in function of a rotor position of the electric machine of FIG. 2.

FIG. 3 shows the self inductances Laa, Lbb and Lcc of the inductances of the respective phase A, B, C of the electric machine 20 in function of a rotor position of the electric machine 20. Moreover, all mutual inductances Lab, Lba, Lac, Lca, Lbc, Lcb are shown.

The rotor position is represented in electrical degrees.

Based thereon, equivalent inductances can be calculated for each phase A, B, C of the electric machine 20.

Figure 4:
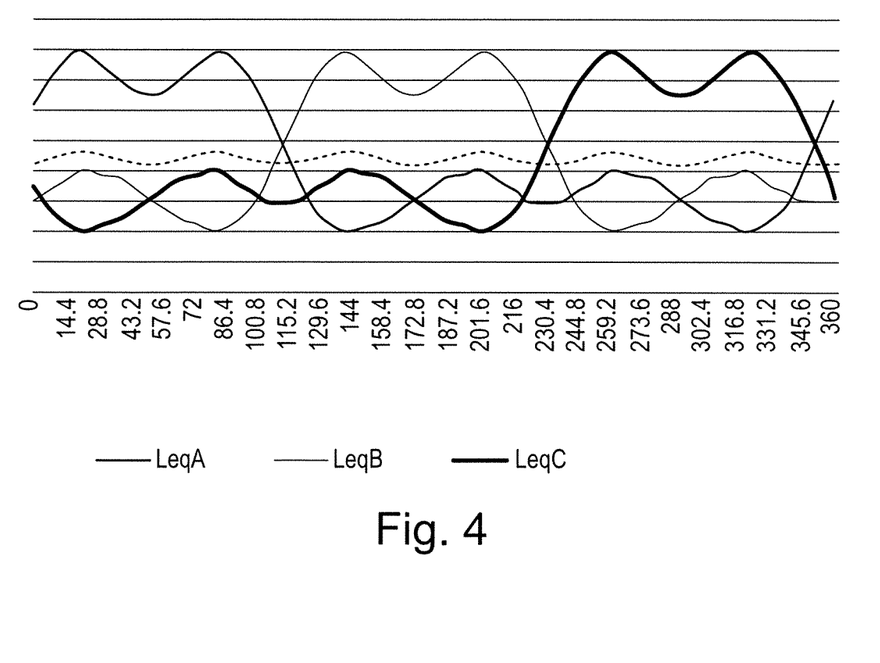
FIG. 4 shows exemplary equivalent inductances in function of the rotor position for each phase of the electric machine of FIG. 2 being derived from the exemplary self inductances and exemplary mutual inductances of FIG. 3.

These equivalent inductances are denote LequA, LequB, LequC and are represented in FIG. 4.

However, as has been mentioned before, not necessarily all phases A, B, C are used.

Figure 5:
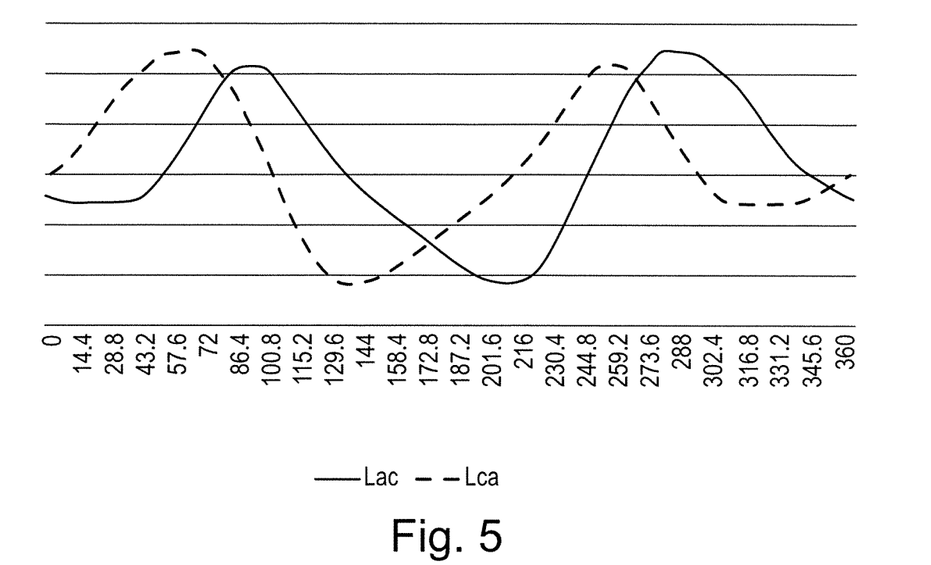
FIG. 5 shows exemplary inductances of a first subset of two phases of the electric machine in function of a rotor position.

FIG. 5, for example shows a case where phase B is not used. The resulting mutual inductances Lac and Lca resulting from the use of phases A and C are represented in function of a rotor position (electric degrees).

Figure 6:
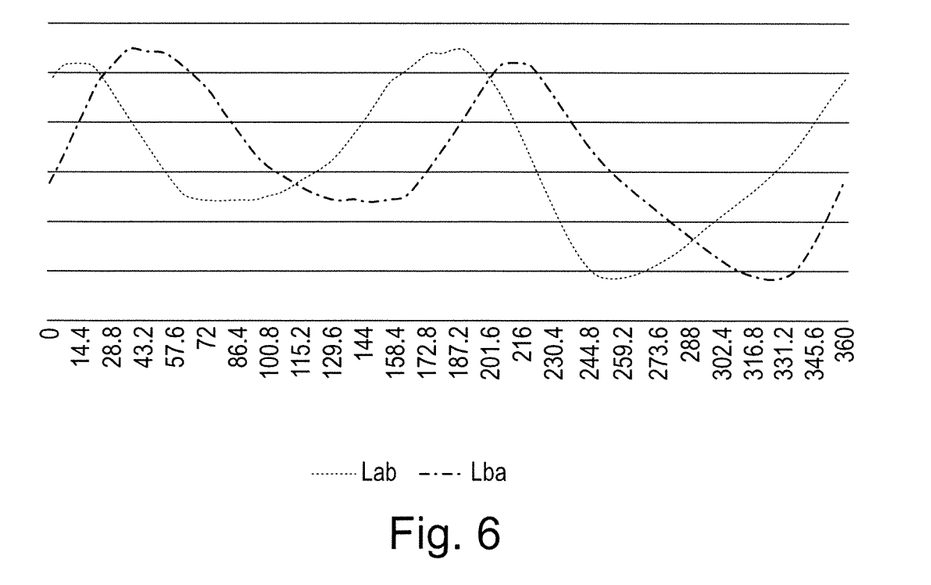
FIG. 6 shows exemplary inductances of a second subset of two phases of the electric machine in function of a rotor position.

FIG. 6 shows an example, where phase C is not used. The resulting mutual inductances Lab and Lba resulting from the use of phases A and B are represented in the figure in function of a rotor position (electric degrees).

Figure 7:
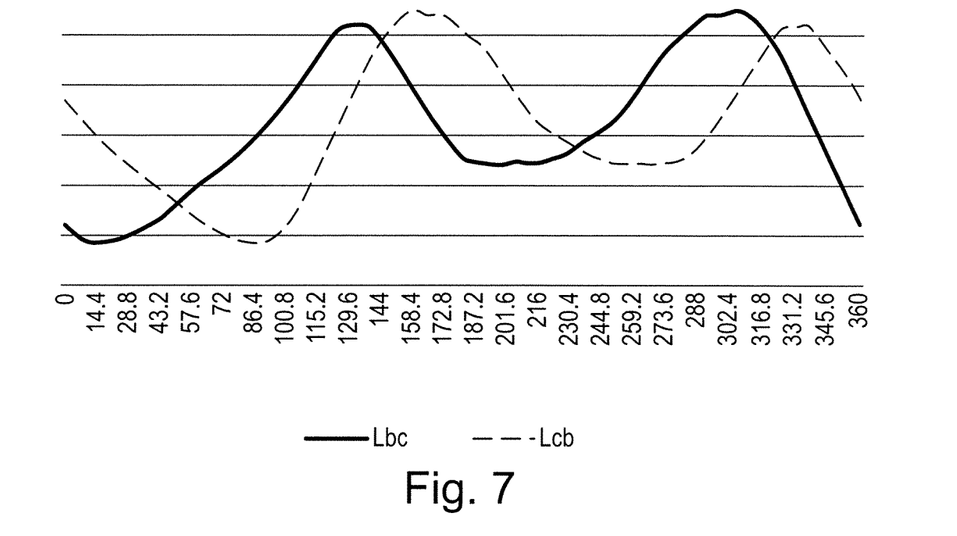
FIG. 7 shows exemplary inductances of a third subset of two phases of the electric machine in function of a rotor position.

FIG. 7 shows a further example, where phase A is not used. The resulting mutual inductances Lbc and Lcb resulting from the use of phases B and C are represented in function of a rotor position (electric degrees).

It can thus be seen from FIGS. 4 to 7 that the inductances vary in function of the rotor position.

Consequently, for performing the method, a look-up table is provided in the memory 40 of the data processing device 30, wherein the equivalent inductances of all available combinations of numbers of the three phases A, B, C are represented in function of the position of the rotor of the electric machine 20. Moreover, the equivalent inductances are represented in function of at least one of a current and a duty cycle. Obviously, the look-up table includes the values being represented in FIGS. 4 to 7.

It is thus easy, based on a given rotor position, to select the number of phases A, B, C such that the highest equivalent inductance is provided.

Subsequently, in a fourth step ST4, the traction inverter unit 18 is controlled such that the selected number out of the three phases of the electric machine 20 forms part of the charging circuit 26. For example, the power switches S2 and S5 may be opened such that phase B of the electric machine 20 does not form part of the charging circuit (cf. FIG. 2).

In this context, the traction inverter unit 18 is operated as an interleaved DC-DC converter, interleaving the selected ones of the three phases. In the above example, the phases A and C are interleaved.

It is noted that the same applies if instead of phase B phase A or phase C are not selected.

According to an alternative of step ST3, the number of the three phases is selected such that the lowest electromagnetic losses are produced. This means that out of the available combinations of numbers of the three phases the alternative offering the lowest electromagnetic losses is chosen.

This is also done using a look-up table being provided in the memory 40 of the data processing device 30 which in this example contains the electromagnetic losses of all available combinations of numbers of the three phases in function of the position of the rotor of the electric machine 20. Moreover, the electromagnetic losses can be represented in the look-up table in function of at least one of a current and a duty cycle.

Again, in a fourth step ST4, the traction inverter unit 18 is controlled such that the selected number out of the three phases of the electric machine 20 forms part of the charging circuit 26.

Figure 9:
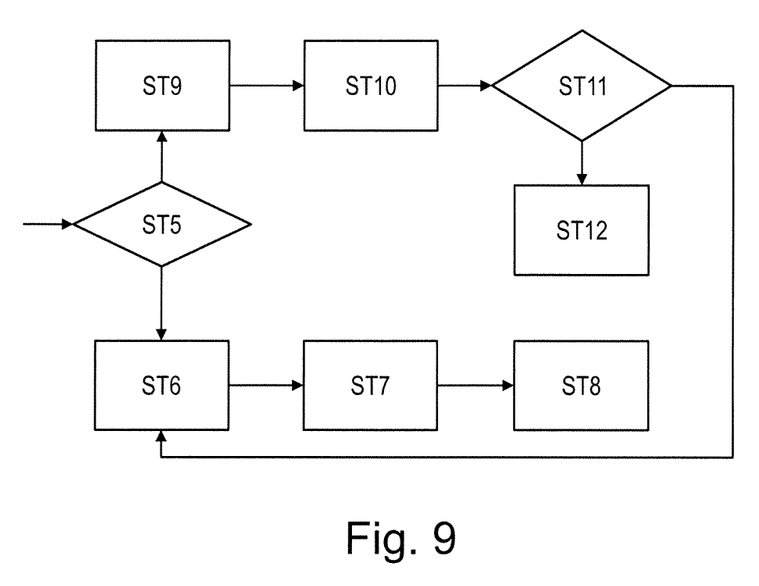
FIG. 9 shows steps of a further example of a method according to the present disclosure.

A further example of the method for controlling the drivetrain 14 of the electric vehicle 10 during DC-charging of the traction battery 16 will be explained in conjunction with FIG. 9.

In this example, a duty cycle is evaluated (cf. step ST5) and if the duty cycle falls within a predefined duty cycle range, it is determined that only two phases of the electric machine 20 and the corresponding portions of the inverter unit 18 will be used (step ST6). This means that if the duty cycle falls within the predefined duty cycle range, the selection of all three phases A, B, C as components of the charging circuit is excluded.

The predefined duty cycle range is for example 49% to 51%.

In this case, using at least one of the above-mentioned look-up tables the subset of two phases is selected which offers the minimum electromagnetic losses or the maximum inductance (step ST7). Then the inverter unit 18 is controlled such that the selected phases are used as part of the charging circuit (ST8).

If the duty cycle to be performed falls outside the predefined duty cycle range, all three phases A, B, C are pre-selecting (ST9) as components of the charging circuit.

Subsequently, the maximum inductance or the minimum losses of this solution is determined using the above-mentioned look-up tables (ST10).

Thereafter, the losses or the inductance of the pre-selected three phases is compared to a worst case, i.e. a case of maximum losses or minimum inductance being achievable with two phases only (ST11).

If the losses are bigger or the inductance is smaller than in the two-phase alternative, then the method is continued at step ST6, i.e. only two phases are used. Otherwise, all three phases are used (ST12).

It is noted that the numbering of the steps has been performed for the ease of explanation only and does not imply any number of steps or an order according to which the steps are performed.

Other variations to the disclosed examples can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A method for controlling a drivetrain of an electric vehicle during DC-charging of a traction battery of the drivetrain via a DC charging interface of the drivetrain, the DC charging interface electrically couplable to a DC charging station outside the electric vehicle, the drivetrain comprising the traction battery, a N-phase traction inverter unit, a N-phase electric machine and a charging circuit, the electric machine being electrically coupled to the traction battery via the traction inverter unit, the charging circuit comprising at least partially the traction inverter unit and at least partially the electric machine, and the DC charging interface being electrically connected to the N-phase traction inverter unit and the N-phase electric machine, the method comprising:
controlling the traction inverter unit such that the traction inverter unit operates as a DC-DC converter,
receiving a position of a rotor of the electric machine,
selecting a number out of the N phases of the electric machine as components of the charging circuit, the selection being dependent on the position of the rotor of the electric machine, and
controlling the traction inverter unit such that the selected number out of the N phases of the electric machine forms part of the charging circuit.

2. The method according to claim 1, further comprising controlling the traction inverter unit to operate as an interleaved DC-DC converter, interleaving the selected ones of the N phases.

3. The method according to claim 1, further comprising selecting out of the available combinations of numbers of the N phases an alternative offering the highest equivalent inductance.

4. The method according to claim 3, further comprising receiving from a look-up table the equivalent inductance of all available combinations of numbers of the N phases in function of the position of the rotor of the electric machine.

5. The method according to claim 4, further comprising representing the equivalent inductances in the look-up table in function of at least one of a current and a duty cycle.

6. The method according to claim 1, further comprising selecting out of the available combinations of numbers of the N phases an alternative offering the lowest electromagnetic losses.

7. The method according to claim 6, further comprising receiving from a look-up table the electromagnetic losses of all available combinations of numbers of the N phases in function of the position of the rotor of the electric machine.

8. The method according to claim 7, further comprising representing the magnetic losses in the look-up table in function of at least one of a current and a duty cycle.

9. The method according to claim 1, further comprising:
excluding selection of all N phases as components of the charging circuit if a duty cycle to be performed falls within a predefined duty cycle range, and
pre-selecting all N phases as components of the charging circuit if the duty cycle to be performed falls outside the predefined duty cycle range.

10. The method according to claim 9, further comprising comparing the electromagnetic losses of all N phases to the electromagnetic losses being produced by the subset of the N phases having the highest electromagnetic losses and by selecting all N phases as components of the charging circuit only if the electromagnetic losses produced by all N phases are lower than the electromagnetic losses produced by the subset of the N phases having the highest electromagnetic losses.

11. A data processing device for carrying out the steps of the method according to claim 1.

12. The data processing device according to claim 11, comprising a first control interface being connectable to the traction inverter unit such that the traction inverter unit is controllable by the data processing device and a second control interface being connectable to a controller of the electric machine, the second control interface being configured for receiving a position of the rotor of the electric machine.

13. A drivetrain for an electric vehicle, the drivetrain comprising the data processing device according to claim 11, the traction battery, the N-phase traction inverter unit and the N-phase electric machine, the electric machine being electrically coupled to the traction battery via the traction inverter unit and the data processing device being communicatively connected to at least the traction inverter unit such that the traction inverter unit is controllable by the data processing device.

14. An electric vehicle having the drivetrain according to claim 13, the vehicle (10) comprising at least one wheel being coupled to the drivetrain.

\* \* \* \* \*